Figure 2:
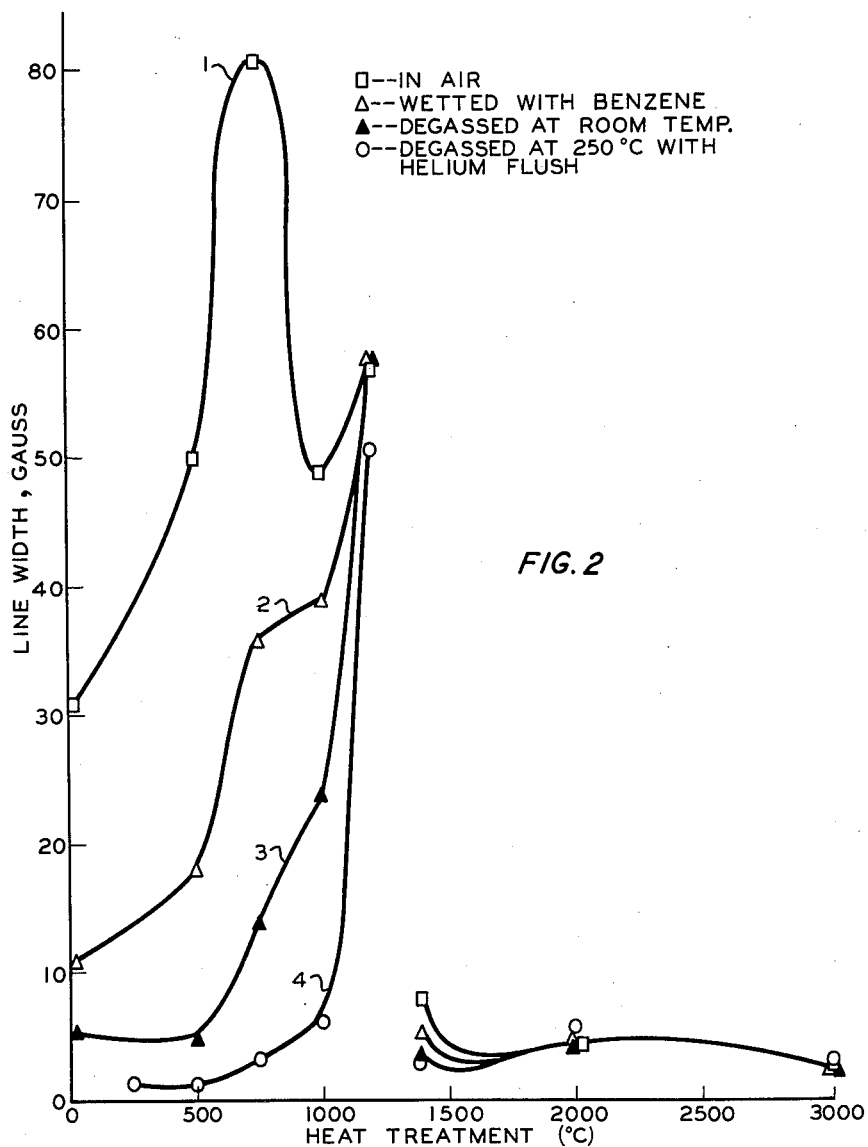

April 17, 1962     R. L. COLLINS     3,029,576

ACTIVATED CARBON BLACK

Filed Oct. 23, 1959

INVENTOR.
R. L. COLLINS

BY Hudson C Young

ATTORNEYS

3,029,576
ACTIVATED CARBON BLACK
Russell L. Collins, Bartlesville, Okla., assignor to Phillips Petroleum Company, a corporation of Delaware
Filed Oct. 23, 1959, Ser. No. 848,420
4 Claims. (Cl. 55—68)

This invention relates to a process for preparing an activated carbon black. In one aspect it relates to a process for the production of a carbon black having increased surface area which area has a high degree of attraction for paramagnetic substances. In another aspect it relates to an adsorptive carbon black suitable for the removal of paramagnetic substances from process streams when they are present as small but intolerable impurities.

Today, many industries recognize that the removal of invisible impurities constitutes an important function of activated carbon. Many industrial products contain adsorbable impurities in such minute amounts that they are not detected by an ordinary analysis, but even so, the presence of such impurities can cause difficulties in processing the product, or in its application and use. The adsorbable impurities can cause foaming during concentration operations, reduce filtration rates, retard crystal growth, and inhibit chemical reaction. The use of activated carbon to remove such impurities simultaneously corrects these various difficulties.

In the prior art, conventional carbon blacks, although they constitute an inexpensive and commercial source of carbon, have been found to be generally unsuitable for the adsorption of impurities. Consequently, many organic chars have been prepared which, because of their amorphous structure, are capable of removing large quantities of impurities, such as colored bodies, tar, and other substances having structural groupings which are favorable for mechanical adsorption to take place. Carbon blacks, because of their dense, quasi-graphitic structure, have generally smaller surface areas than chars. Thus, it would be expected that they would be much less effective in the physical adsorption of impurities. However, I have found their surfaces to be unexpectedly selective for paramagnetic impurities.

It is known that the ability of carbon blacks to adsorb paramagnetic impurities is related to the surface area of the carbon black, as measured by the nitrogen adsorption method; but more importantly, this adsorptive ability of carbon black is related to the enhancement of the line width of the carbon black microwave absorption spectrum by the presence of oxygen in proximity to the unpaired electrons on the carbon black surfaces.

According to the prior art, it might be thought that unpaired electron concentration would correlate directly with surface area; however, I have found that such is not the case. I have discovered that the unpaired electron concentration decreases sharply as the temperature is increased through the range 250° to 1400° C. During this heating, the surface area and the selectivity for the adsorption of paramagnetic materials pass through maximums. Further increase of the temperature of the black leads to the formation of graphitic structure, the surface of which is not selective for the adsorption of paramagnetic materials.

The temperature range of the heat treatment is established to provide the maximum surface area for the specific black, regardless of whether it has been made by furnace or impingement methods, and whether it is of the easy processing, medium processing, high or low modulus, high intermediate, or super abrasive resistant type, so long as the characteristic quasi-graphitic structure of the black is still present. The period of heating may vary over a wide range from 15 minutes to 24 hours, and pressures employed should not exceed 1 micron of mercury. The resulting product will have altered surface activity which provides an efficient adsorber for paramagnetic materials.

It is an object of this invention to provide a process for producing an activated carbon black. It is another object to provide a carbon black with a surface having a high degree of selectivity for paramagnetic substances. It is a further object to provide a carbon black suitable for the adsorption of paramagnetic substances from process streams when they are present in trace amounts.

Figure 1:
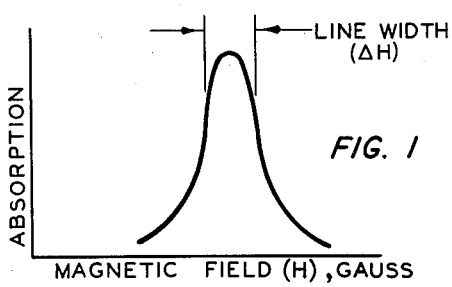

Further objects and advantages of this invention will become apparent to those skilled in the art from a study of the accompanying disclosure, appended claims, and attached drawings, wherein;

FIG. 1 is a graph of absorption of microwaves versus magnetic field strength; and FIG. 2 is a graph of line width versus heat treatment of a particular carbon black.

At this point it would be well to tabulate the paramagnetic materials which can be quantitatively adsorbed and removed by the novel carbon blacks developed by the process of this invention. These paramagnetic materials include molecular oxygen, nitric oxide, the triphenylmethyls, various ketyls, semi-quinones, and the like. The triphenylmethyls include compounds in which one or more of the phenyl radicals may have substituted for hydrogen other phenyl radicals, alkyl radicals of 1 to 4 or more carbon atoms, chlorine, bromine, fluorine, nitro, amino, hydroxy, alkoxy, and the like. No attempt will be made to name examples of all of these substituted triphenylmethyls but typical examples are triphenylmethyl, tri - biphenylmethyl, tri - nitrophenylmethyl, tri - methylphenylmethyl, methyl-', ethyl-'', tertiary butyl'''-triphenylmethyl, methyl', chloro'', phenyl'''-triphenylmethyl, and 4 methoxy'triphenylmethyl.

Ketyl is a free radical which can be prepared in solution by reaction between benzophenone and metallic sodium. As in the case of triphenylmethyl the phenyl groups of the benzophenone may be substituted provided the substituents are not reactive with metallic sodium or with one another.

The semi-quinones are quinone radicals or residues in which two unpaired electrons are present on one end of the molecule from which the oxygen atom has been removed.

Studies of heat treated carbon black have shown that $\pi$-type electrons predominate among the unpaired electrons present on carbon black surfaces which have been heat treated in the range 250 to 1400° C. Above 1400° C. the number of unpaired electrons on the carbon black surface increases, but this increase is brought about by the formation of $\sigma$ electrons which are characteristic of the graphitic structure which is produced by severe heat treatments above about 1200° C.

Carbon blacks of the rubber reinforcing variety are characterized by having much of their structure in the quasi-graphitic state. By quasi-graphitic state is meant a somewhat disarranged stacking of platelets made up of hexagonally arranged carbon atoms. (These platelets have much the physical appearance of the well known hexagonal chicken wire.) The change from quasi-graphitic structure to graphitic structure involves the rearrangement and compacting of these platelets into a more orderly and crystalline structure. The unpaired electron associated with the quasi-graphitic structure are of the $\pi$ variety and have a great deal of mobility in the comparatively large inner layer deformity whereas the unpaired electrons which are associated with graphitic surfaces are relatively less mobile, because they are closely associated with a proton located at an exposed point as the platelets fuse together into the graphitic structure.

While the above discussion sets out the most probable theoretical characterization of carbon black as known today, I do not wish to be limited by any such theory. I have included my theoretical beliefs because it was believed that the remarks would be helpful in pointing out the differences in the surface of carbon black which can be heat treated in the region 250 to 1400° C. to appreciably increase the surface area of the carbon black and to explain why the increased surface has a high degree of adsorbability for paramagnetic substances.

Carbon blacks as commercially prepared will have on their surface adsorbed or loosely held impurities such as oxygen, tars, pitches and other hydrocarbon residues, semi-quinones, and the like. Because they might be deleterious to the new adsorptive surfaces being formed, they are preferably removed before applying the heat treatment of the present invention. The tars, pitches, hydrocarbon residues, semi-quinones and the like can be removed by aromatic hydrocarbon solvents. An especially desirable solvent in this class is toluene. Since oxygen is rather tenaciously held by the carbon black its removal can usually be completely obtained by the use of one or more helium flushes while the carbon black is being degassed utilizing high vacuum techniques.

A useful tool in following the development of unpaired electrons on the carbon black surface consists of a microwave absorption spectrometer. In this instrument a klystron operating near 10,000 megacycles per second transmits microwaves through a $TE_{102}$ transmission cavity positioned between the poles of an electromagnet. The sample of carbon black is placed in the center of the transmission cavity. Slow variation of the magnetic field which is modulated at 15 cycles per second permits the use of the phase sensitive detection method. A suitable instrument for making these measurements has a sensitivity such that 0.07 cc. of $5 \times 10^{-5}$ molar $\alpha,\alpha$-diphenyl-$\beta$-picryl hydrazyl (DPPH) in benzene gives a signal to noise ratio of about 3.

Theoretically the resonance absorption of microwaves by the spinning electrons can be represented by a plot such as shown in FIGURE 1 of absorption versus magnetic field strength. The number of electron spins is then represented by the area under the absorption curve and the line width in gausses is defined as the distance between the inflection points of the curve. However, in the instrument described above such an absorption curve is not obtained from the data. In the phase sensitive detection method, the line width corresponds to the distance between maximum positive and negative excursions of the recorded curve and the number of spins will be determined by comparison with a sample of known spin concentration. FIGURE 2 shows a plot of line width versus heat treatment for a sample of Spheron-6 (a medium processing channel black) which had been given the previous treatment indicated by the symbols on the plot. This series of curves shows the tenacity with which molecular oxygen is held by the carbon black surface on heat treating at various temperatures. For this particular black it will be noted that the adsorbed oxygen has a great influence on the line width of the magnetic field in resonance with the spinning electrons. This perturbation of the unpaired electrons, by molecular oxygen in proximity thereto, makes counting of the unpaired electrons more difficult because the number of unpaired electrons in a small increment of the scanning decreases, and consequently, a high degree of sensitivity in the spectrometer as well as low background noise must be attained or erroneous results and misleading conclusions will be achieved.

The unpaired electron concentration was determined by comparing the carbon black samples with a DPPH solution of known electron spin concentration. In the microwave adsorption spectrometer described above, the spin concentration was calculated by the relation:

$$S = M_1 S_0 L_0 \text{ Antilog } (0.1 \overline{db})/M_0 L_1 m_1$$

where $S$ = spin concentration, spins per gram
$M_1$ = first moment of resonance curve of the unknown
$M_0$ = first moment of resonance curve of DPPH solution
$S_0$ = number of spins in DPPH solution within the cavity
$L_0$ = deflection of cavity resonance with DPPH in cavity
$L_1$ = deflection of cavity resonance with unknown in cavity
$\overline{db}$ = difference in db attenuation setting for DPPH and unknown, and
$m_1$ = mass in grams of unknown sample in the 0.900 inch within the cavity Pertinent data on the carbon blacks which may be employed in this invention are given in Table I.

*Table I*

| Type of carbon black | Commercial designation | Number of spins/g. $\times 10^{-19}$ | Nitrogen surface area, $M^2/g.$ | $O_2$ adsorbed, ml. STP/g., percent of monolayer [1] | | Mass susceptibility $\times 10^6$ | | |
|---|---|---|---|---|---|---|---|---|
| | | | | 1% | 40% | Net | Paramagnetic | Diamagnetic |
| Fine extrusion furnace (FEF) | Philblack A | 10.0 | 45.6 | 0.122 | 4.82 | −0.82 | 0.21 | −1.03 |
| High abrasion furnace (HAF) | Philblack O | 8.0 | 75.1 | 0.197 | 7.95 | −0.79 | 0.17 | −0.96 |
| Intermediate SAF (ISAF) | Philblack I | 9.2 | 113.7 | 0.300 | 12.0 | −0.76 | 0.19 | −0.95 |
| Super abrasion furnace (SAF) | Philblack E | 8.1 | 134.6 | 0.355 | 14.2 | −0.73 | 0.17 | −0.90 |
| Easy processing channel (EPC) | Wyex | 15.0 | 114.2 | 0.302 | 12.1 | −0.59 | 0.32 | −0.91 |
| Medium processing channel (MPC) | Spheron 6 | 13.9 | 111.5 | 0.295 | 11.8 | −0.66 | 0.29 | −0.95 |
| Fine thermal (FT) | P-33 | 5.9 | 13.7 | 0.036 | 1.45 | −0.95 | 0.13 | −1.08 |
| Acetylene | Same | 3.8 | 58.0 | 0.155 | 6.20 | −2.6 | 0.08 | −2.68 |
| Graphitized channel black | Graphon | 1.1 | 93.7 | 0.237 | 9.92 | −2.8 | 0.02 | −2.82 |

[1] Calculated assuming 14.1 sq. Å for molecular area of $O_2$.

From the above table, it will be seen that all of the commercial rubber reinforcing carbon blacks differ in spin concentration by only a factor of 4. Their diamagnetic properties indicate that their surfaces would be suitable for treatment in accordance with the present invention because their diamagnetic susceptibilities were about the same, and were low compared to graphon and acetylene blacks which are known to have considerably well developed graphitic surface. This indicates that the quasi-graphitic structure predominates in all of the rubber reinforcing carbon blacks and the differences in their net magnetic mass susceptibility is due to the difference in their paramagnetic properties. It will be noted that the oxygen adsorbed per gram of carbon black and representing 40% of a monomolecular layer varies from 1.45 to 14.2 milliliters STP per gram.

As a typical example of the carbon blacks given in Table I, Spheron-6 (a medium processing channel black) was selected to show the effect of heat treatment at various temperatures on the adsorptive properties of the carbon black.

It was found that heat treatment to 750° C. caused a reduction of unpaired electrons from $13.9 \times 10^{19}$ to $9.4 \times 10^{19}$. This heat treatment also caused an increase in surface area from 111.5 sq. meters per gram to 161 sq. meters per gram. The oxygen adsorbed, expressed in milliliters of oxygen at standard conditions per gram, calculated for 40% monolayer increased from 11.8 to 16.5 milliliters per gram.

Referring again to FIGURE 2 which graphically depicts the variation in line width with heat treatment and various secondary treatments for Spheron 6, the effect of these differing secondary methods for removing oxygen before line width measurement is indicated in curves 1, 2, 3 and 4.

The Spheron 6 was first heat-treated in a non-oxidizing atmosphere for a period of two hours. The only variable was the temperature which ranged from about 25° C. to 3000° C. Thus, seven samples of Spheron 6 were provided, which had each been heat treated to a temperature different from the others, and covering a wide range.

Next a portion of each of the above Spheron 6 samples was taken, placed in an open ended melting point tube, given one of four secondary treatments, and then had its line width determined in the spectrometer. These measurements were plotted as a function of the temperature of heat treatment, with the several secondary treatments as the parameters.

It will be noted on curve 1, which indicates that the line width measurement was taken in air, i.e., without any secondary treatment after the heat treatment, that the enhancement of the line width by oxygen at 500° C. is about 48 gauss, at 750° C. about 78 gauss, at 1000° C. approximately 43 gauss, and at 1400° C. aproximately 5 gauss. Therefore, the maximum surface area, which has been determined to be developed by heat treatment at 750° C., corresponds to the maximum line width of 78 gauss, which also appears at 750° C.

Curve 2 of FIGURE 2 shows the effect of heat treatment on the line width of Spheron 6, where the sample, after being placed on the melting point tube, is wetted with a volume of benzene about 100 times the volume of the sample, before the line width reading is made. It will be seen that the enhancement of the line width by oxygen at 500° C. is about 17 gauss, at 750° C. about 33 gauss, at 1000° C. about 33 gauss, at 1200° C. approximately 7 gauss, and at 1400° C. approximately 3 gauss. Therefore, the oxygen is so preferentially adsorbed that benzene, which should be strongly adsorbed by the active carbon surface, because of its similar structure to carbon black, is not effective in displacing the oxygen from the carbon black surfaces developed in accordance with the process of this invention.

Curve 3 of FIGURE 2 shows the effect of heat treatment on line width where the sample is degassed at room temperature by the use of a diffusion pump, before the measurement of line width. It will be observed that the enhancement of the line width by oxygen at 500° C. is about 3 gauss, at 750° C. about 9 gauss, at 1000° C. about 18 gauss, at 1200° C., about 7 gauss, and at 1400° C. about 1 gauss. This shows that degassing at room temperature is not completely effective in removing adsorbed oxygen.

Curve 4 of FIGURE 2 shows the effect of heat treatment on line width where the Spheron 6 sample was degassed at room temperature with a diffusion pump, slowly heated to 250° C., then pressured with helium, and degassed again. This helium flushing and degassing was repeated several times. This curve shows that small amounts of the oxygen will still not be displaced by repeated helium flushing, despite the high diffusion coefficient of this element.

It has been found that evacuation of the carbon black is not necessary for the removal of small amounts of adsorbed oxygen, because heating of the carbon black containing adsorbed oxygen tends to remove or destroy the oxygen.

In order to prove this contention, the line width in gauss was measured utilizing the microwave absorption spectrometer for samples of carbon black to which measured quantities of oxygen had been added. Line width measurements were made before and after heating the samples to 96° C. for 2 hours. The oxygen containing samples were compared in line width with a sample given the same treatment to which no oxygen had been added. Since the enhancement of the line width is directly proportional to the adsorbed oxygen, the reduction shown in Table II demonstrates that oxygen has been removed by the mild heat treatment.

*Table II*

[Gauss]

| Samples | Ml oxygen added per gram black | Line width at room temperatures | |
|---|---|---|---|
| | | Before heating | After heating to 96° C. for 2 hrs. |
| 1 | 0 | 2.9 | 3.2 |
| 2 | 0.306 | 30 | 5.4 |
| 3 | 0.584 | 52 | 16.6 |

When the activated carbon black prepared according to this invention is stored in hermetically-sealed containers until use as an adsorbent, no further treatment is necessary. However, the adsorbent may have been exposed to the atmosphere between the time of preparation and the time of use. In that case, a moderate heat treatment between 50° and 300° C. in a non-oxidizing atmosphere is preferred to remove adsorbed oxygen.

An example of the manner in which the activated carbon black of this invention can be used follows: In the polymerization of ethylene, it is desirable to have as little oxygen as possible in the ethylene gas charged to the process. The feed gas is charged to the gas holder at the rate of 30,000 cu. ft./hr., through a 14″ line at 5 p.s.i.g. pressure. The squirrel cage compressor utilized to move the gas is employed to mix in about 0.6 oz. of the product of this invention to each 1000 cu. ft. of gas feed. A "shaker" device capable of maintaining a flow of adsorbent at the rate of approximately 0.3 oz./min. is in communication with the interior of the compressor. Thus, the ethylene flow rate should be about 500 cu. ft./min. A hermetically-sealed container of the adsorbent of this invention is inserted in the shaker mechanism, from which the adsorbent is fed in to the gas stream.

As a result of adding this small amount of activated carbon black, the oxygen content of the ethylene stream can be reduced about 10 parts per million. If the oxygen in the stream treated in this manner is reduced below 10 parts per million, it is sufficiently pure for the polymerization process. Assuming an ethylene stream to have about 10 parts per million oxygen, it would therefore require only about 37.8 lbs. of the treated carbon black to remove substantially all of the oxygen from a million cubic feet of the gas.

It will be obvious to one skilled in the art of gas purification that similar utility can be achieved by treating natural gas, ammonia synthesis gas, and other gas streams, which are to be subjected to an amine scrubbing step. For example, when contacting streams with aqueous amino compounds, such as mono-, di-, or triethanolamine, for the removal of hydrogen sulfide, carbon dioxide, carbonyl sulfide and other acidic gaseous impurities, in order to inhibit oxidative corrosion in the process equipment, the novel carbon black of this invention is quite suitable.

Various modifications and alterations of this invention will become apparent to those skilled in the art without departing from the scope and spirit of this invention, and it is to be understood that the foregoing discussion and examples are illustrative of a preferred embodiment and do not unduly limit this invention.

Having described my invention, I claim:

1. An activated carbon black produced by heating a carbon black characterized by a predominantly quasi-graphitic structure in the temperature range from 250° C. to 1400° C. and at a pressure not to exceed 1 micron of mercury during a period of time ranging from 15 minutes to 24 hours.

2. In a method of treating a process stream containing a small quantity of oxygen to remove the latter, the step of feeding particles of an activated carbon black produced by heating a carbon black characterized by a predominantly quasi-graphitic structure in the temperature range from 250° C. to 1400° C. and at a pressure not to exceed 1 micron of mercury during a period of time ranging from 15 minutes to 24 hours into said process stream in an amount sufficient to provide 3.78 pounds of activated carbon black per part of oxygen per million standard cubic feet of said stream to substantially removed said oxygen from said process stream by adsorption on said particles.

3. The method according to claim 2 wherein said process stream is substantially all ethylene.

4. In a method of treating a process stream containing oxygen, the step of feeding particles of an activated carbon black produced by heating a carbon black characterized by a predominantly quasi-graphitic structure in the temperature range from 250° C. to 1400° C. and at a pressure not to exceed 1 micron of mercury during a period of time range from 15 minutes to 24 hours into said process stream in an amount sufficient to substantially remove said oxygen present in small quantities from said process stream by adsorption on said particles.

References Cited in the file of this patent

UNITED STATES PATENTS

| | | |
|---|---|---|
| 2,117,497 | Owens et al. | May 17, 1938 |
| 2,260,746 | Hanawalt et al. | Oct. 28, 1941 |
| 2,424,294 | White | July 22, 1947 |

OTHER REFERENCES

Carbon Black, Industrial and Engineering Chemistry, Vol. 21, No. 12, pages 1288–1290.